United States Patent
Gundavelli et al.

(10) Patent No.: US 11,284,271 B2
(45) Date of Patent: Mar. 22, 2022

(54) EXTENDING WIRELESS LOCAL GUEST ACCESS TO PRIVATE RADIO SERVICES

(71) Applicant: Cisco Technology, Inc., San Jose, CA (US)

(72) Inventors: Srinath Gundavelli, San Jose, CA (US); Indermeet Singh Gandhi, Bangalore (IN); Vimal Srivastava, Bangalore (IN); Sudhir Kumar Jain, Fremont (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 83 days.

(21) Appl. No.: 16/713,181

(22) Filed: Dec. 13, 2019

(65) Prior Publication Data
US 2021/0185540 A1    Jun. 17, 2021

(51) Int. Cl.
| | |
|---|---|
| *H04W 16/14* | (2009.01) |
| *H04W 12/069* | (2021.01) |
| *H04L 101/375* | (2022.01) |
| *H04L 101/654* | (2022.01) |
| *H04W 84/12* | (2009.01) |

(52) U.S. Cl.
CPC ......... *H04W 16/14* (2013.01); *H04L 61/3075* (2013.01); *H04L 61/6054* (2013.01); *H04W 12/069* (2021.01); *H04W 84/12* (2013.01)

(58) Field of Classification Search
CPC ... H04W 16/14; H04W 12/069; H04W 84/12; H04L 61/3075; H04L 61/6054
See application file for complete search history.

(56) References Cited

U.S. PATENT DOCUMENTS

| | | | |
|---|---|---|---|
| 9,455,964 B2 | 9/2016 | Mower | |
| 10,880,748 B1 | 12/2020 | Gundavelli et al. | |
| 2011/0280213 A1 | 11/2011 | Calhoun et al. | |
| 2013/0024915 A1 | 1/2013 | Jones et al. | |
| 2015/0319102 A1* | 11/2015 | Esdaile | H04W 48/00 709/225 |
| 2016/0037338 A1* | 2/2016 | Venkiteswaran | H04W 12/069 726/4 |
| 2016/0219333 A1* | 7/2016 | Warrick | H04N 21/2665 |
| 2016/0242025 A1 | 8/2016 | Aliyar | |
| 2017/0048713 A1 | 2/2017 | Guday et al. | |
| 2018/0270363 A1 | 9/2018 | Guday et al. | |
| 2019/0037335 A1 | 1/2019 | Steck et al. | |

(Continued)

OTHER PUBLICATIONS

International Search Report and Written Opinion in counterpart International Application No. PCT/US2020/063559, dated Feb. 12, 2021, 12 pages.

*Primary Examiner* — Duc C Ho
(74) *Attorney, Agent, or Firm* — Edell, Shapiro & Finnan, LLC

(57) ABSTRACT

Methods are provided for extending sponsored Wi-Fi guest access capability to other enterprise tools and/or access technologies such as private access networks including private LTE and 5G networks. The methods include a controller detecting a user equipment (UE) that is connected to a guest access service provided by a wireless local access network (WLAN) and generating a profile for the guest access service. The methods further include the controller providing, to the UE, the profile to cause the UE to connect to the guest access service provided by another access network.

20 Claims, 6 Drawing Sheets

(56) References Cited

U.S. PATENT DOCUMENTS

| | | | |
|---|---|---|---|
| 2020/0008138 A1* | 1/2020 | Sasindran | H04W 4/025 |
| 2020/0037335 A1* | 1/2020 | Killadi | H04W 16/14 |
| 2020/0162929 A1* | 5/2020 | Cimpu | H04W 52/367 |
| 2021/0051478 A1 | 2/2021 | Avula et al. | |

* cited by examiner

EXTENDING WIRELESS LOCAL GUEST ACCESS TO PRIVATE RADIO SERVICES

TECHNICAL FIELD

The present disclosure relates to interworking between various network access technology architectures.

BACKGROUND

To accommodate different users of an enterprise world, a wireless local access network (WLAN), such as a Wi-Fi® access network, may be segmented into various services. Separate access may be enabled to each such segmented service. The services may include, but are not limited to, access to specific network resources, and enforcement of a specific set of policies such as access controls, authorization policies, Internet access, firewall rules, etc. One segmented service of a Wi-Fi network is guest access. Guest access may provide users with only limited access to resources in the enterprise world. For example, guest access may only provide access to a public network such as the Internet and/or provide access to voice over Internet Protocol (VoIP) services.

Sometimes, remediation of a captive portal may be required to obtain guest access. Additionally, guest access may need to be sponsored by a non-guest user within the enterprise. In such a case, a sponsor domain may be employed to authorize the guest access, e.g., by using the portal. The user may be required, e.g., to input a name and an email address at the portal or via an email link, and include information about the sponsor (e.g., the sponsor's email address). The sponsor domain may then formally approve the user and store user information into its database, thereby authorizing the user as a guest. The user/guest may then, in turn, be given access to the segmented service (sponsored guest access) provided by the Wi-Fi network.

DESCRIPTION OF EXAMPLE EMBODIMENTS

Overview

Figure 1:
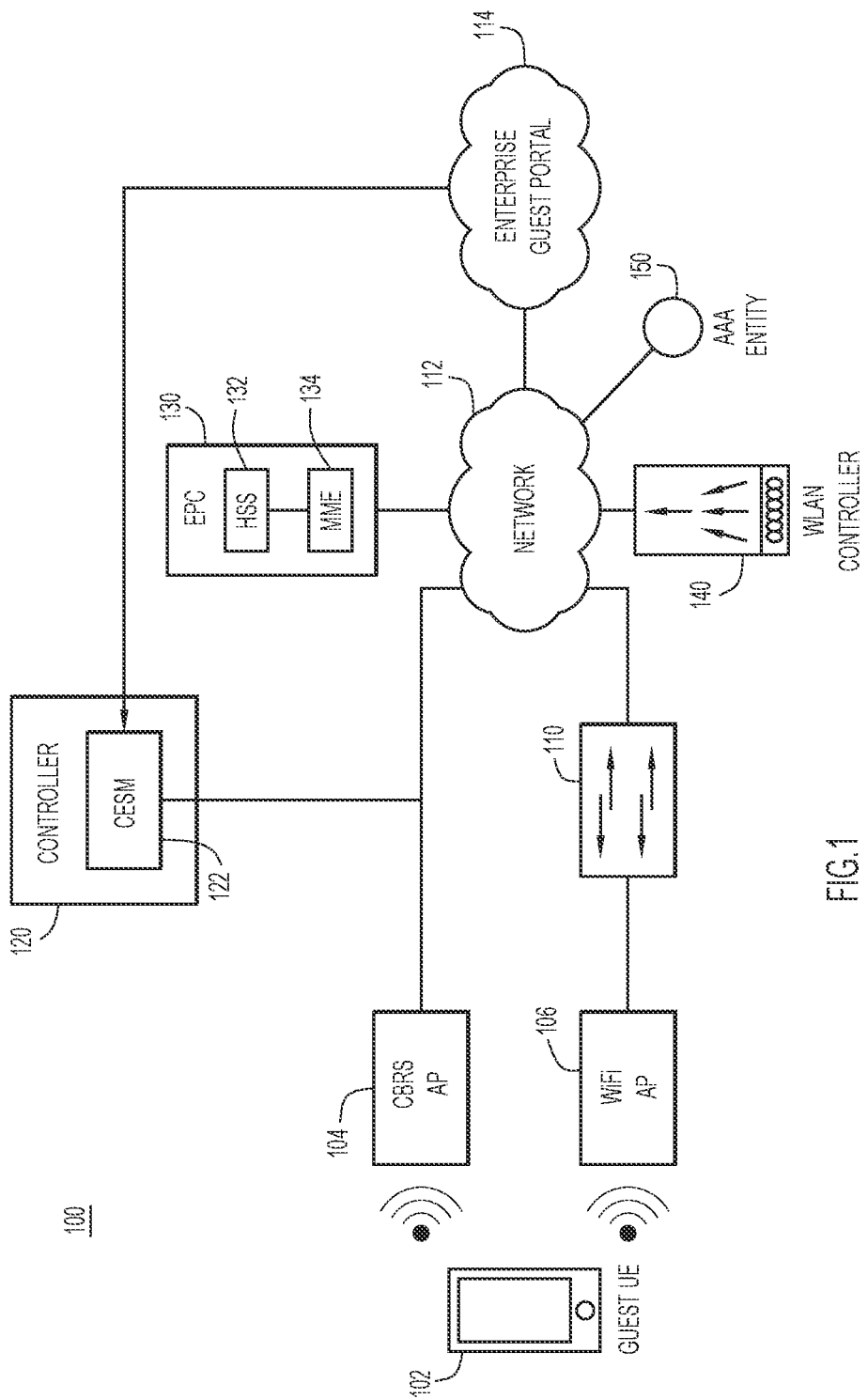
FIG. 1 is a block diagram of a network architecture for extending Wi-Fi sponsored guest access to a private radio access network, according to an example embodiment.

Briefly, methods, apparatuses and computer readable medium are provided to extend a sponsored Wi-Fi guest access capability to other enterprise tools and/or access networks. One method includes a controller detecting user equipment (UE) that is connected to a guest access service provided by a wireless local access network (WLAN), generating a profile for the guest access service, and providing, to the UE, the profile to cause the UE to connect to the guest access service provided by another access network.

Another method includes user equipment (UE) obtaining, from a controller, a profile. The UE is connected to a guest access service provided by a wireless local access network (WLAN). The method further includes the UE activating the profile to connect to a guest access service provided by another access network and the UE connecting to the guest access service provided by the another access network using the profile.

Example Embodiments

To handle increasing traffic from various user equipment (UE) devices in the enterprise world, new access technologies are being developed and explored. One example of the new access technologies is a Private Long Term Evolution (LTE) radio network. The private LTE radio network is gaining popularity and may become prevalent in the enterprise world. One type of the private LTE radio network is a Citizens Broadband Radio Service (CBRS) network. The Federal Communications Commission (FCC) in the United States allocated radio spectrum in the 3550-3700 megahertz (MHz) band (e.g., 3.5 gigahertz (GHz) band) to CBRS for shared wireless broadband use by enterprises under certain sharing regulations. Enterprises can use this CBRS spectrum to set up the private LTE radio network and allow access to its UEs. The private LTE radio network is likely to co-exist with the already deployed Wi-Fi network and may offer similar segmented services including sponsored guest access. Another example of the new access technologies is fifth generation virtual mobile network core (5G) networks such as a private 5G network. While example embodiments discussed below describe a private LTE radio network, one of ordinary skill in the art would readily appreciate that example embodiments also apply to a private 5G network.

Example embodiments provide sponsored guest access via one or more of these other access technologies (a private radio network, the private LTE radio network, the CBRS access network, and/or other access networks). The sponsored guest access available on the Wi-Fi access network is also provided on the CBRS access network, for example, without any additional registration or authentication portals. In various example embodiments, a guest access or a sponsored guest access is enabled for various access networks of an enterprise via a single step, operation, or registration procedure without having to go through an authentication portal twice. And, the sponsored guest access available via the Wi-Fi network may be extended to another access network without further authentication.

Additionally, exemplary embodiments provide enterprise information technology (IT) security with visibility into the guest user traffic on various access systems including a correlation between the guest user's sessions on various access networks.

FIG. 1 is a block diagram of a network architecture 100 for extending Wi-Fi sponsored guest access to a private radio access network, according to an example embodiment. According to one or more example embodiments, a private radio access network may be a private LTE or a private 5G network. In an example embodiment of FIG. 1, the private radio access network supports CBRS services.

The network architecture 100 includes a guest UE 102, a CBRS access point (AP) 104, a Wi-Fi AP 106, a forwarding element (FE1) 110, a network 112, and an enterprise guest portal 114. Additionally, the network architecture 100 includes a controller 120 with a CBRS enterprise subscription manager (CESM) 122 therein and an evolved packet core (EPC) 130 with control plane entities for the private radio access network therein such as a home subscriber server (HSS) 132 and a mobility management entity (MME) 134. The network architecture 100 further includes control plane entities for the Wi-Fi access network. These control plane entities are WLAN controller 140 and an authentication, authorization, and accounting (AAA) entity 150.

In FIG. 1, the guest UE 102 accesses an enterprise guest portal 114 via the CBRS AP 104 or the Wi-Fi AP 106. The CBRS AP 104 is connected to the network 112 and the Wi-Fi AP 106 is connected to the network 112 via the FE1 110. The Wi-Fi AP 106 is controlled by the WLAN controller 140. The WLAN controller 140 manages Wi-Fi APs including radio frequency resources and the lifecycle management of the Wi-Fi AP 106. Additionally, the WLAN controller 140 manages Wi-Fi subscriber sessions. The guest UE 102 is authenticated for Wi-Fi access using the AAA entity 150. The AAA entity 150 also implements policies for access to the Wi-Fi access by various subscribers. In some deployments, the AAA entity 150 is used only for authentication, and subscriber policy management is managed by a separate function.

The network 112 could be a software defined access fabric, or another internet protocol network, or an enterprise network. That is, the private LTE and Wi-Fi access networks are deployed in an enterprise network and are connected to the same network 112.

This is provided by way of an example only and not by way of a limitation. While FIG. 1 only depicts two APs, one of ordinary skill in the art would readily appreciate that multiple APs may exist in a network depending on a particular implementation. Further, one of ordinary skill in the art would readily appreciate that various access networks are within the scope of various example embodiments.

The network 112 connects the guest UE 102 to the enterprise guest portal 114. The enterprise guest portal 114 is used for registering and authenticating guest users (the guest UE 102) through a sponsored domain guest access. In one or more example embodiment, the guest UE 102 may be connected to the enterprise guest portal 114 via any one of the available access networks. The enterprise guest portal 114 enables the guest UE 102 with access credentials for all available access networks. Also, the generated credentials for access to various networks are associated with the same guest UE 102. For example, the generated Wi-Fi and the CBRS access network credentials are associated or binded with the same guest UE 102. This allows the network to monitor the UE's traffic on both of the access networks and for example, apply some consistent security policies. Further, the enterprise is provided with visibility of the guest UE 102 access to the enterprise network. Additionally, the enterprise is configured to disconnect one or more existing connections of the guest UE 102 from the enterprise guest access when the time expires and/or for other reasons.

In one example deployment, authenticated guest users may be switched from using the Wi-Fi access network to using a CBRS access network for receiving the guest access service when the Wi-Fi access network is too congested, and/or for load balancing purposes and/or based on user settings, preferences, and/or input. To switch the guest UE 102, the enterprise guest portal 114 redirects the guest UE 102 to the CESM 122 for information required to access the CBRS network. The CESM 122 generates a guest CBRS embedded subscriber identity module (eSIM) profile package and downloads it to the guest UE 102. The CESM 122 hosts a subscription manager data preparation (SM-DP) component for remotely provisioning the guest UE 102. The eSIM profile package, activated at the guest UE 102, on-boards the guest UE 102 onto the CBRS access network to avail guest access and segmented services of the enterprise.

The CESM 122 resides on the controller 120. The controller 120 may be a data network architecture (DNA) controller (DNA-Center) or a software domain architecture (SDA) controller. The CESM 122 generates and maintains eSIM profiles for its enterprise users and guests. The CESM 122 allocates an eSIM profile to a guest and updates the HSS 132, either directly or via the MME 134 of the EPC 130, by adding an entry to the HSS 132 with a newly allocated eSIM profile. Further, when the allowed guest access expires, the CESM 122 removes the entry from the HSS 132 via the MME 134.

The MME 134 manages handover signaling and network connection signaling. The CESM 122 may communicate with the MME 134 to trigger updates of the CBRS information or entries stored in the HSS 132.

Although FIG. 1 depicts the EPC 130, this is an example only. According to another example embodiment mentioned above, the private 5G network may be provided as an addition or as an alternative. The CESM 122 may then connect to an enhanced Node B of the 5G network instead of the MME 134 and update eSIM profiles in a user data management (UDM/UDR) repository instead of the HSS 132. In one embodiment, the CESM 122 may communicate directly with the UDM/UDR repository to update eSIM profiles.

Figure 2A:
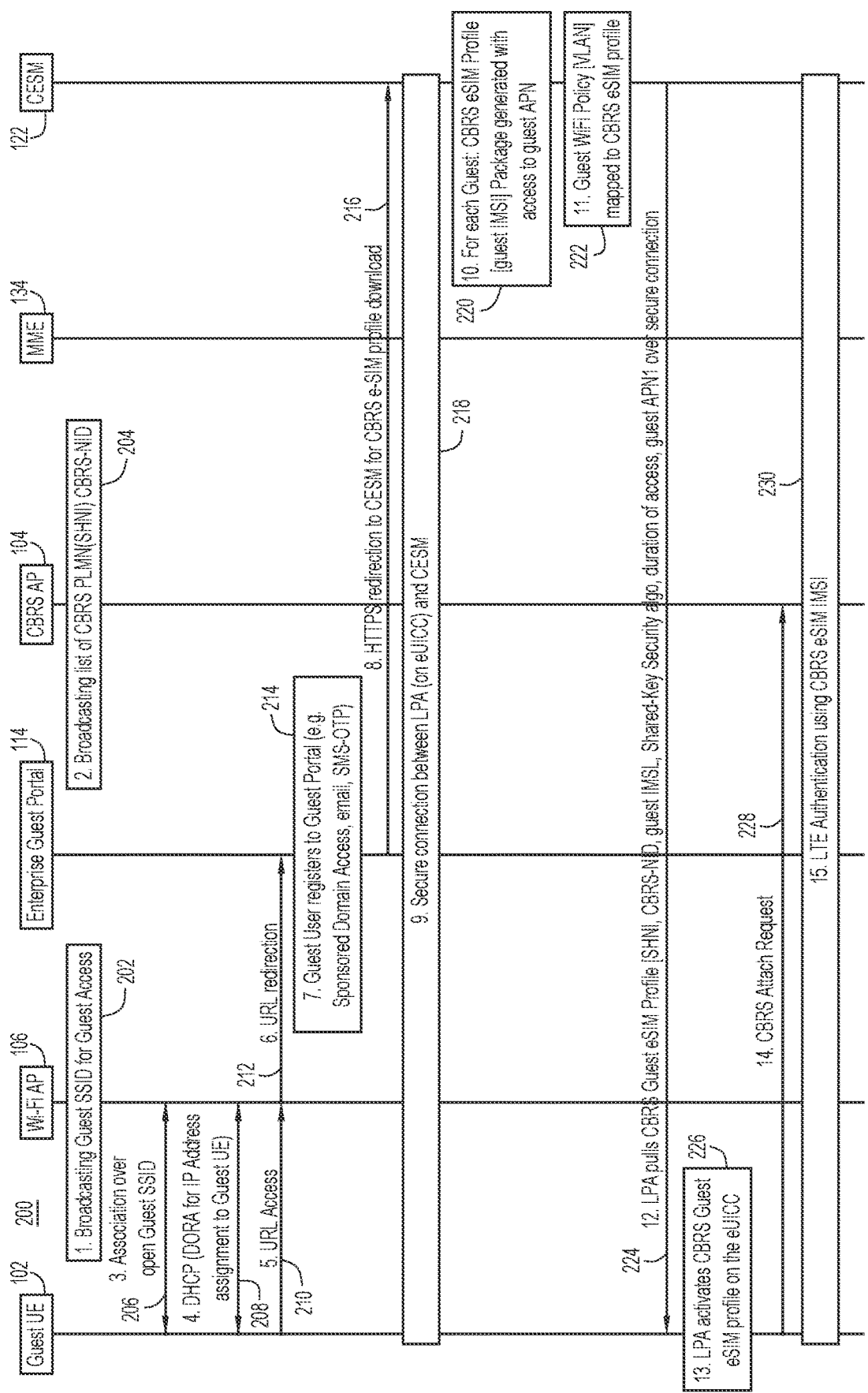
FIGS. 2A and 2B are sequence diagrams illustrating a method of extending Wi-Fi sponsored guest access to a private radio access network, according to an example embodiment.
Figure 2B:
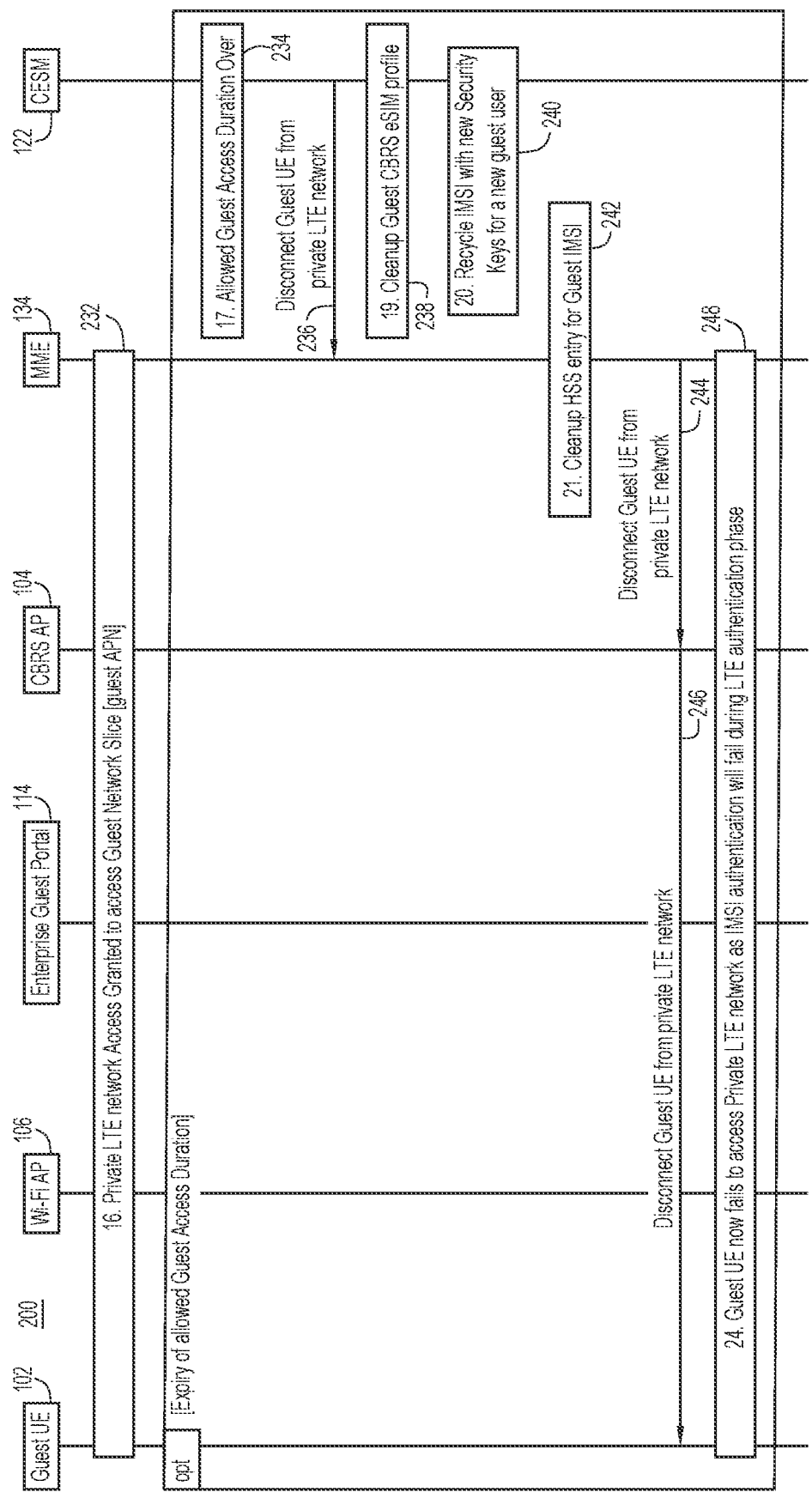

FIGS. 2A and 2B are sequence diagrams illustrating a method 200 of extending the Wi-Fi guest access to a private radio access network, according to an example embodiment. In an example embodiment of FIG. 2, the private radio access network supports CBRS services.

The method 200 involves the guest UE 102, the Wi-Fi AP 106, the enterprise guest portal 114, the CBRS AP 104, the MME 134, and the CESM 122 (of the controller 120), described above with reference to FIG. 1.

At 202, the Wi-Fi AP 106 broadcasts Wi-Fi information for UEs to connect to the Wi-Fi network. For example, since the Wi-Fi network is segmented, the Wi-Fi AP 106 broadcasts a Service Set Identifier ("SSID") that uniquely identifies a sponsored domain guest access service provided on the Wi-Fi network.

Similar service structuring is realized for the CBRS network using an Access Point Name (APN) and/or CBRS Network Identifier (NID). As such, at 204, the CBRS AP 104 broadcasts CBRS information. For example, the CBRS information may include a list of segmented services provided by the CBRS AP 104. For each service, the information provided may include one or more of the following identifiers: a Public Land Mobile Network (PLMN) identifier, a Shared Home Network Identifier (SHNI), and/or a CBRS NID. The CBRS information and Wi-Fi information may be broadcasted at substantially same time.

At 206, the guest UE 102 associates or attaches to the Wi-Fi AP 106. As a result, an association is formed between the guest UE 102 and the Wi-Fi AP 106 over an open Guest SSID.

At 208, a dynamic IP address is assigned to the guest UE 102. In this case, a Dynamic Host Configuration Protocol (DHCP) is executed between the Wi-Fi AP 106 and the guest UE 102 in which discovery, offer, request, and acknowledgment (DORA) is performed to obtain the dynamic IP address assignment.

At 210, based on the assigned IP address, the guest UE 102 accesses an URL for authenticating guest access. At 212, the Wi-Fi AP 106 redirects the guest UE 102 to the enterprise guest portal 114 (an URL redirection) for the authentication. In other words, the guest UE 102 obtains an IP address and launches a browser to access some internet or internal site based on the obtained IP address. The network will redirect the HTTP session to the enterprise guest portal 114.

At 214, the enterprise guest portal 114 registers the guest UE 102 via a sponsored domain guest access. The registration can occur in a number of ways. For example, a user may input user related information such as a user name, an affiliation, user's email address, and/or user's phone number, via a user interface (UI) displayed on the guest UE 102. The user may further input sponsor or host related information such as the sponsor's name, sponsor's phone number, and/or sponsor's email. Based on the sponsor related information, a request for authorization of the guest UE 102 is transmitted to the sponsor. The request may be provided in a form of an email and/or a short message service (SMS) message, for example. If the sponsor accepts the request, access credentials for the Wi-Fi access network can be provided to the guest UE 102 via the same form of a communication or in a different manner e.g., via an email and/or an SMS message. After the sponsor accepts the request, the session will be marked as authorization complete with no need for Wi-Fi password generation. The user can now access internet and/or internal guest services. Additional authentication may be required in a form of a one-time password (SMS-OTP).

At some point, the guest UE 102 may want to switch to another access network (such as the private LTE network or the CBRS network, provided as an example). The user may want to switch to another access network to receive the same guest access service when signal strength of the currently used access network (e.g., the Wi-Fi network) is bad or when the current access network is congested. In this case, the guest UE 102 determines that a quality of service (QoS) offered by another access network is better than the QoS of the current access network. For example, the guest UE 102 may continuously measure signal strengths of various access networks and based on a predetermined criteria, select one access network over others based on the measurements. In this case, the guest UE 102 may prompt the user for an authorization to switch to another access network. In an alternative example embodiment, the guest UE 102 may be configured to automatically accept a switch to another access network with a better QoS. According to yet another example embodiment, a connection manager of the guest UE 102 may determine a better performing access network and authorize the switch.

According to another example embodiment, after the guest UE 102 is authenticated at 214 or during the authentication of 214, a UI may be displayed on the guest UE 102 with available access networks for a user selection. In other words, an option of selecting an access network to obtain guest services may be provided to the user during or after the authentication.

At 216, the enterprise guest portal 114 redirects (an HTTPS redirection) the guest UE 102 to the CESM 122. The guest UE 102 is redirected to the CESM 122 to obtain a profile that is required to access the selected access network. According to one example embodiment, the CESM 122 provides a CBRS guest eSIM profile package (referred to as an eSIM profile package or a provisioning profile, interchangeably).

Alternatively, the profile may include any provisioned credentials that are non-IMSI based credentials. For example, when the profile is a certificate, the certificate may be generated with a network access identifier (NAI) as the identity in its content. Extensible Authentication Protocol-Transport Layer Security (EAP-TLS) and EAP-Tunneled Transport Layer (TTL) may then be used as authentication methods. The network associates these credentials with a pseudo IMSI in the network. The NAI may be based on a Media Access Control (MAC) address of the guest UE 102.

In another form, the profile may be a user name and password and/or a certificate downloaded to the guest UE 102 to provide access to the selected access network. In one form, the profile such as the user name and password may be delivered via email or SMS.

Referring back to FIG. 2A, at 218, a secure connection over the Wi-Fi network is established between a local profile assistant (LPA) of the guest UE 102 and the CESM 122. The LPA is a system application that manages profiles available on the eSIM of the guest UE 102 or on an embedded Universal Integrated Circuit Card (eUICC) of the guest UE 102.

At 220, for each guest user, the CESM 122 generates a unique eSIM profile package. Each eSIM profile package (owned by the enterprise) may include an International Mobile Subscriber Identify (IMSI), security algorithm(s), and a guest APN. The CESM 122 maintains a range of IMSIs allocated for the sponsored domain guest access. An IMSI may be generated using a hash function on User Identification Number (UIN) block allocated for the enterprise guest users. The IMSIs are recycled and reused for next sponsored guest accesses.

Each eSIM profile package has ephemeral properties for an allowed duration of the guest access. After an expiration the allowed duration, the eSIM profile package is deleted. While the IMSI is reused for the next eSIM profile packet, the security algorithm(s) (security key(s)) are newly generated. Further, different eSIM profile packages may be associated with different guest services such as an internet access service or a voice over IP (VoIP) service, or both.

At 222, the CESM 122 maps the guest Wi-Fi access policy or policies (e.g. virtual local access network (VLAN), SGT) to a corresponding eSIM profile package. That is, the guest UE 102 has identity credentials for a Wi-Fi access network, and also for a private radio access network. These identities are correlated to the same registered guest UE 102 and to the same guest user policy i.e., profiles are binded. For example, the CESM 122 maintains access network credentials for various access networks associated with a MAC address of the guest UE 102.

At 224, the LPA of the guest UE 102 pulls, over a secure connection (such as HTTPS), the eSIM profile package. The eSIM profile package includes the SHNI, the CBRS-NID, the guest IMSI, the shared-key security algorithm (a security key), the duration of access, and the guest APN. The LPA running on the eUICC of the guest UE 102 initiates the downloading of the eSIM profile package to switch to the domain sponsored guest access service provided by the CBRS access network.

At 226, the LPA activates the downloaded provisioning profile to switch to the guest access service provided by the private LTE network. The LPA deactivates or disables the service provider's eSIM or provisioning profile and activates or enables the coexisting, downloaded provisioning profile.

At 228, based on the information in the activated provisioning profile, the guest UE 102 sends a CBRS attach request to the CBRS AP 104.

At 230, the CESM 122 authenticates the guest UE 102 based on the information in the CBRS guest eSIM profile (performs an LTE authentication). For example, the CESM 122 determines whether the provided IMSI is assigned to an authorized guest user based on entries in the HSS 132.

Referring now to FIG. 2B, the method 200 continues with operation 232. At 232, the MME 134 helps to connect the authorized guest UE 102 to a CBRS Guest Network Slice through the APN provided as part of the eSIM profile package. The guest UE 102 accesses the sponsored guest access services provided by the private LTE network instead of the Wi-Fi network. The authentication enables the guest UE 102 to access the sponsored guest services using both access networks.

As part of managing the eSIM profiles, the CESM 122 also deletes expired eSIM profile packages. As shown in FIG. 2B, the guest access duration has expired (opt) indicated by a box around operations 234-248. As such, at 234, the CESM 122 detects that the allowed guest access duration is over or expired. Based on this, at 236, the CESM 122 disconnects the guest UE 102 from the private LTE network. The CESM 122 triggers delete session request through a private LTE core network function. At 238, the CESM 122 cleans up or deletes the eSIM profile package with the expired duration.

At 240, the CESM 122 recycles the IMSI from the CBRS guest eSIM profile package with an expired duration. In other words, the IMSI is returned to a pool of IMSIs available for the guest access service provided by the private LTE network. A new guest user access receives a newly generated eSIM profile package that may include the same IMSI but will also include newly generated security key(s) and new allowed duration.

At 242, the CESM 122 communicates via the private LTE network with the MME 134 to delete an entry for the guest IMSI from the HSS 132 (shown in FIG. 1).

At 244, the MME 134 triggers a request to the CBRS AP 104 to disconnect the guest UE 102 from the private LTE network. At 246, the CBRS AP 104 disconnects the guest UE 102 from the private LTE network. At 248, the guest UE 102 fails to access the private LTE network because IMSI authentication now fails during the authentication phase. The CESM 122 rejects the authentication of a re-attach to the private LTE network after the expiration of the allowed duration.

According to various example embodiments, the domain sponsored guest access service provided by the Wi-Fi network is extended to another access network without requiring any additional authentication. A sponsored guest access service identified by the SSID of the Wi-Fi network is mapped to a corresponding guest access service in another access network by generating a profile.

While the example embodiment described above deploys a provisioning profile that may include a PLMN-NID-APN identifying the corresponding guest access service in a private LTE network, this is provided by way of an example only. According to various example embodiments, the profile is authentication information or data used to obtain access to a guest access service. For example, the profile is an enterprise profile such as a certificate, or a user name and password, or the eSIM profile explained above. Additionally, according to various example embodiments, the profile can be downloaded to the user or provided by other means such as via an email communication or a short messaging service.

The enterprise guest portal 114 enables the authentication of the guest UE 102 for the guest access service in various access networks via a single step or a single authentication process.

According to an example embodiment, a media access control (MAC) address of the guest UE 102 is associated with different user profiles including eSIM profile package for the private LTE network and the IP address assigned for the Wi-Fi access network. As a result of the established correlation between these various profiles, visibility to guest user traffic on various access networks is maintained and a correlation between the user's sessions on various access networks is observed.

According to various example embodiments, sponsored Wi-Fi guest access capability is extended to the CBRS access network. By extending the Wi-Fi guest user onboarding process, the guest UE 102 obtains the eUICC enterprise profile for accessing the domain sponsored guest access provided by the private LTE network (an example of another access network). That is, the enabled credentials allow the guest user to access Wi-Fi and CBRS access networks under a single identity and allow the policy elements in the controller 120 to apply the same set of policies on all of the guest user's traffic on the network 112.

Figure 3:
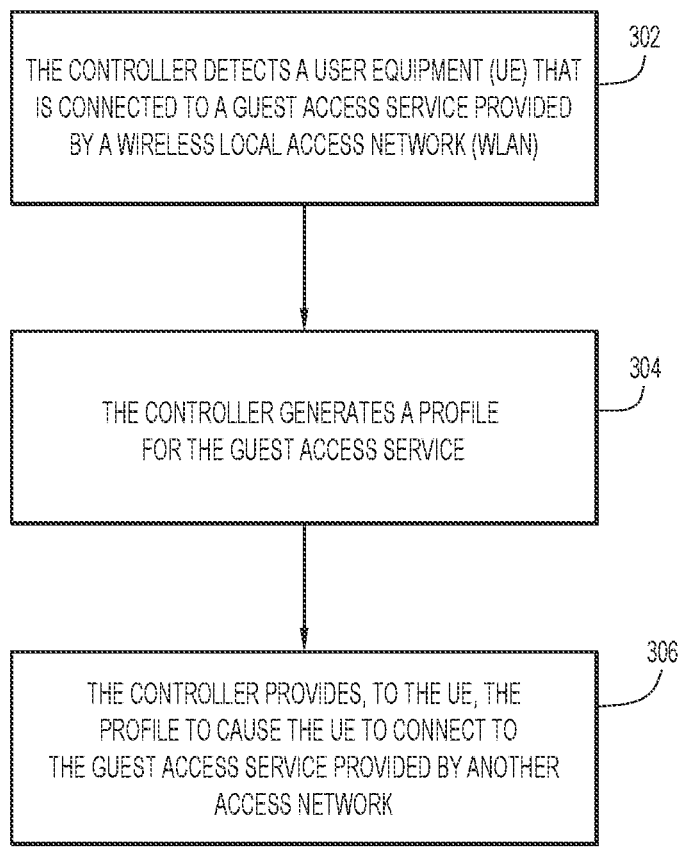
FIG. 3 is a flowchart illustrating a method of providing a profile for extending Wi-Fi sponsored guest access to a private radio access network, according to an example embodiment.

FIG. 3 is a flowchart illustrating a method 300 of providing a profile for extending Wi-Fi sponsored guest access to another access network, according to an example embodiment. The method 300 is performed by the controller 120 which executes the CESM 122 described in FIGS. 1 and 2.

At 302, the controller detects a user equipment (UE) that is connected to a guest access service provided by a wireless local access network (WLAN). At 304, the controller generates a profile for the guest access service. At 306, the controller provides, to the UE, the profile to cause the UE to connect to the guest access service provided by another access network.

According to one or more example embodiments, the detecting operation 302 includes obtaining, from an enterprise guest portal, information for a secure redirection of the UE to communicate with the controller via the WLAN. The enterprise guest portal authenticates the UE for a domain sponsored guest access service provided by the WLAN. The detecting operation 302 further includes establishing, with a local profile assistant (LPA) of the UE, a secure connection via the WLAN based on the information, so as to enable access to the guest access service provided by the WLAN and the another access network without any further authentication.

According to one or more example embodiments, the providing operation 306 includes obtaining from the LPA via the secure connection, a request for the profile and providing, to the LPA, the profile to remotely provision the UE to obtain the guest access service provided by the another access network. The another access network is a Citizens Broadband Radio Service (CBRS) network. The profile further includes at least one of a shared home network identifier (SHNI) or a CBRS network identifier (NID).

According to one or more example embodiments, the another access network is a private radio network or a fifth generation (5G) network.

According to one or more example embodiments, the providing operation 306 includes providing a certificate or authentication information for the UE to obtain the guest access service provided by the another access network.

According to one or more example embodiments, the another access network is a Citizens Broadband Radio Service (CBRS) network. The generating operation 304 includes selecting an International Mobile Subscriber Identity (IMSI) from among a plurality of IMSIs assigned for the guest access service provided by the CBRS network and generating the profile to include the IMSI, an allowed duration of the guest access service, and a security key unique to the profile.

According to one or more example embodiments, the generating operation 304 includes selecting a guest access point name (APN) that corresponds to the guest access service provided by the WLAN and generating the profile to include the guest access point name (APN).

According to one or more example embodiments, the method 300 further includes the controller maps at least one policy of the guest access service provided in the WLAN to the profile. The at least one policy includes a virtual local access network policy.

According to one or more example embodiments, the method 300 further includes the controller detecting an expiration of an allowed duration of the guest access service. The method further includes the controller, in response to detecting the expiration of the allowed duration, deleting an entry for the profile stored in a home subscriber server. The method further includes the controller causing a disconnection of the UE from the guest access service provided by the another access network.

According to one or more example embodiments, the method 300 further includes the controller recycling an International Mobile Subscriber Identity (IMSI) of the profile by generating a new profile for providing the guest access service to a different UE. The new profile includes the IMSI combined with a second unique security key different from a first unique security key of the profile.

Figure 4:
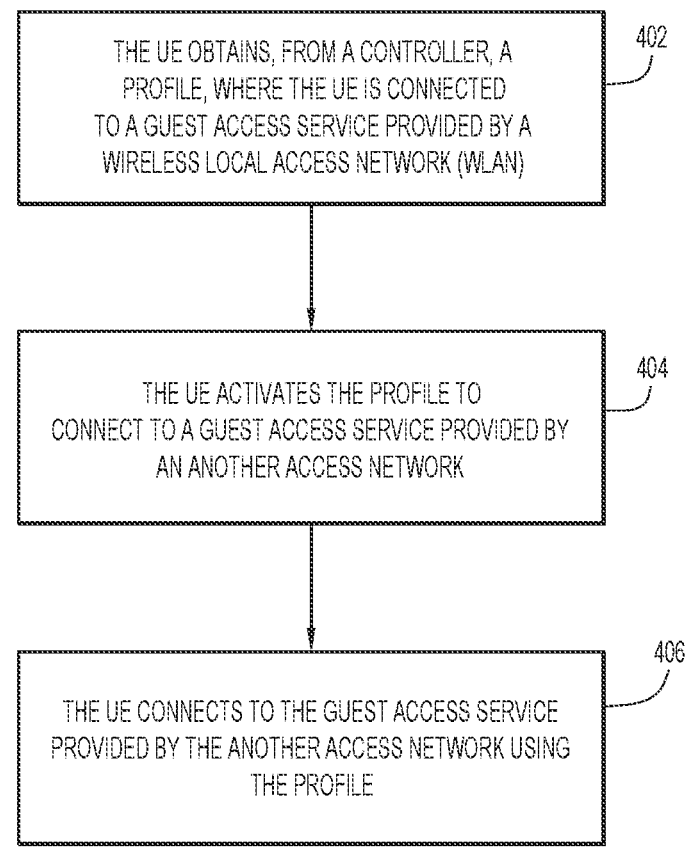
FIG. 4 is a flowchart illustrating a method of providing Wi-Fi sponsored guest access via another access network based on a profile, according to an example embodiment.

FIG. 4 is a flowchart illustrating a method 400 of providing a Wi-Fi sponsored guest access via another access network based on a profile, according to an example embodiment. The method 400 is performed by the guest UE 102 described in FIGS. 1 and 2.

At 402, the UE obtains from a controller, a profile, where the UE is connected to a guest access service provided by a wireless local access network (WLAN).

At 404, the UE activates the profile to connect to a guest access service provided by another access network.

At 406, the UE connects to the guest access service provided by the another access network using the profile.

According to one or more example embodiments, the another access network is a Citizens Broadband Radio Service (CBRS) network.

According to one or more example embodiments, the method 400 further includes the UE storing the profile in an embedded subscription identity module (eSIM) or an embedded universal integrated circuit card (eUICC). The profile includes a temporary identifier allocated for the guest access service, a public land mobile network (PLMN) network identifier (NID) access point name (APN), which identifies the guest access service in the CBRS network, a unique security key, and an allowed duration of connecting to the guest access service.

According to one or more example embodiments, the activating operation 404 includes a Local Provisioning Assistant (LPA) of the UE disabling an active profile of a mobile network operator. The active profile is stored in an embedded subscription identity module (eSIM) or an embedded universal integrated circuit card (eUICC). The activating operation 404 includes the LPA of the UE enables the profile to connect to the guest access service provided by the another access network that is a fifth generation (5G) radio network or a private radio network.

According to one or more example embodiments, the another access network is a Citizens Broadband Radio Service (CBRS) network. The profile includes a shared home network identifier, a network identifier, and an access point name of the CBRS.

Figure 5:
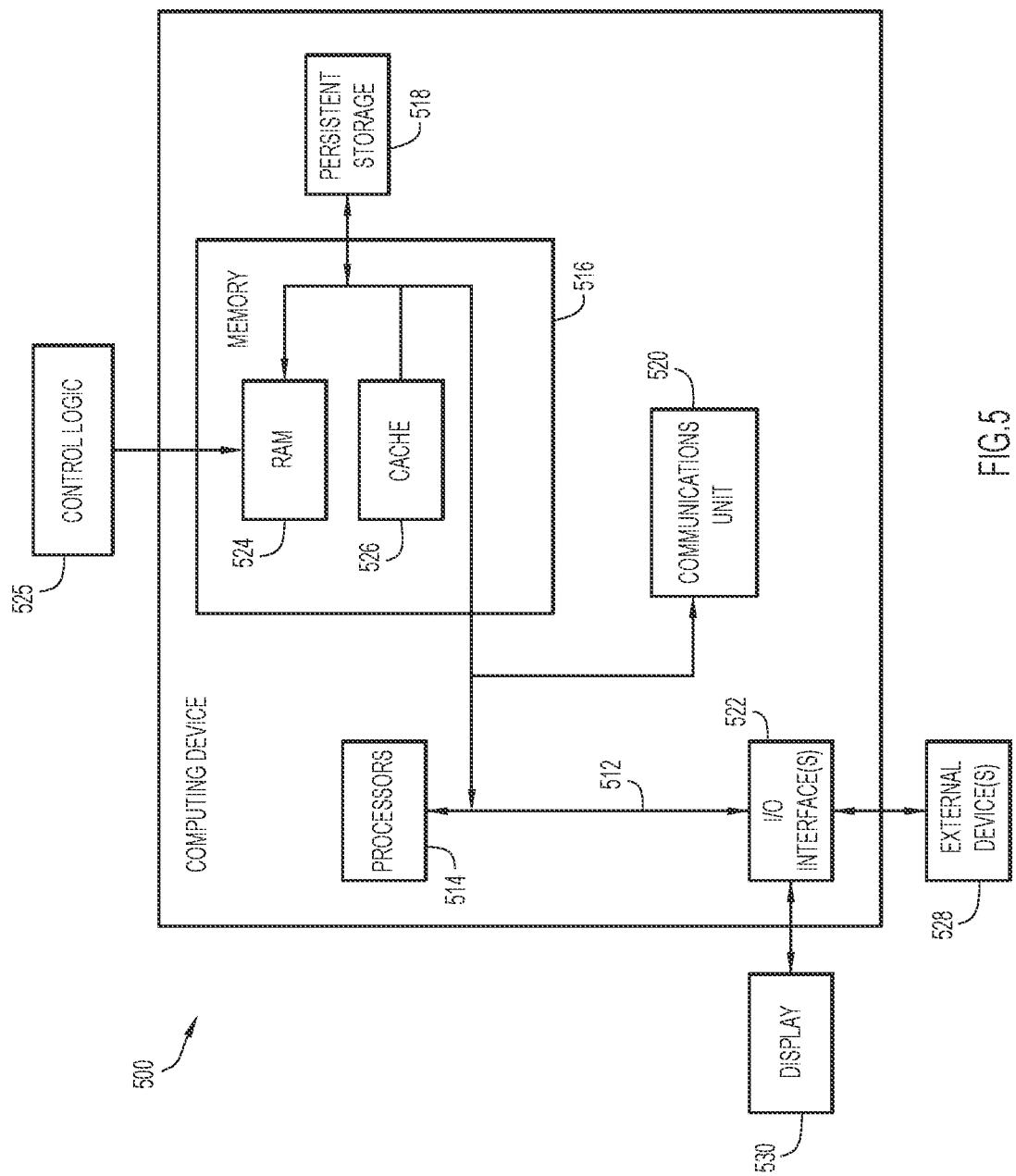
FIG. 5 is a hardware block diagram of a computing device configured to extend Wi-Fi sponsored guest access to another access network, according to various example embodiments.

FIG. 5 is a hardware block diagram of a computing device 500 configured to extend sponsored guest access from a WLAN access network to another access network, according to various example embodiments. The computing device 500 may perform the functions of any of the computing or control entities referred to herein in connection with FIGS. 1-4. That is, the computing device 500 may perform the functions of the controller 120 executing the CESM 122 of FIGS. 1-3 or the functions of the guest UE 102 of FIGS. 1, 2, and 4.

It should be appreciated that FIG. 5 provides only an illustration of one embodiment and does not imply any limitations with regard to the environments in which different embodiments may be implemented. Many modifications to the depicted environment may be made.

As depicted, the computing device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the control logic 525 may be stored in memory 516 or persistent storage 518 for execution by processor(s) 514.

The control logic 525 includes instructions that, when executed by the computer processor(s) 514, cause the computing device 500 to perform one or more of the methods described herein including a method of providing the profile when the computing device 500 is the controller 120 and a method of connecting to the guest access service provided by another access network using the profile when the computing device 500 is the guest UE 102. The control logic 525 may be stored in the memory 516 or the persistent storage 518 for execution by the computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

In still another example embodiment, an apparatus is a controller 120 which executes the CESM 122 described in FIGS. 1 and 2. The apparatus includes a communication interface configured to enable network communications, a memory configured to store executable instructions, and a processor coupled to the communication interface and the memory. The processor is configured to perform operations that include detecting a user equipment (UE) that is connected to a guest access service provided by a wireless local access network (WLAN), generating a profile for the guest access service, and providing, to the UE, the profile to cause the UE to connect to the guest access service provided by another access network.

According to one or more example embodiments, the processor may further be configured to detect the UE by obtaining, from an enterprise guest portal, information for a secure redirection of the UE to communicate with the controller via the WLAN. The enterprise guest portal authenticates the UE for a domain sponsored guest access service provided by the WLAN. The processor may further be configured to detect the UE by establishing, with a local profile assistant (LPA) of the UE, a secure connection via the WLAN based on the information, so as to enable access to the guest access service provided by the WLAN and the another access network without any further authentication.

According to one or more example embodiments, the processor may further be configured to perform providing the profile by: obtaining from the LPA via the secure connection, a request for the profile and providing, to the LPA, the profile to remotely provision the UE to obtain the guest access service provided by the another access network. The another access network is a Citizens Broadband Radio Service (CBRS) network and the profile further includes at least one of a shared home network identifier (SHNI) or a CBRS network identifier (NID).

According to one or more example embodiments, the another access network is a private radio network or a fifth generation (5G) network.

According to one or more example embodiments, the processor may further be configured to provide the profile by providing a certificate or authentication information for the UE to obtain the guest access service provided by the another access network.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    detecting, by a controller, a user equipment (UE) that is connected to a guest access service provided by a wireless local access network (WLAN);
    generating, by the controller, a provisioning profile for the guest access service; and
    providing, by the controller to the UE, the provisioning profile to cause the UE to connect to the guest access service provided by another access network.

2. The method of claim 1, wherein detecting the UE includes:
    obtaining, from an enterprise guest portal, information for a secure redirection of the UE to communicate with the controller via the WLAN, wherein the enterprise guest portal authenticates the UE for a domain sponsored guest access service provided by the WLAN; and
    establishing, with a local profile assistant (LPA) of the UE, a secure connection via the WLAN based on the information, so as to enable access to the guest access service provided by the WLAN and the another access network without any further authentication.

3. The method of claim 2, wherein providing the provisioning profile includes:
    obtaining, from the LPA via the secure connection, a request for the provisioning profile, and
    providing, to the LPA, the provisioning profile to remotely provision the UE to obtain the guest access service provided by the another access network,
    wherein the another access network is a Citizens Broadband Radio Service (CBRS) network, and the provisioning profile further includes at least one of a shared home network identifier (SHNI) or a CBRS network identifier (NID).

4. The method of claim 2, wherein:
    the another access network is a private radio network or a fifth generation (5G) network.

5. The method of claim 1, wherein providing the provisioning profile includes:
    providing a certificate or authentication information for the UE to obtain the guest access service provided by the another access network.

6. The method of claim 1, wherein the another access network is a Citizens Broadband Radio Service (CBRS) network, and generating the provisioning profile includes:
    selecting an International Mobile Subscriber Identity (IMSI) from among a plurality of IMSIs assigned for the guest access service provided by the CBRS network, and
    generating the provisioning profile to include the IMSI, an allowed duration of the guest access service, and a security key unique to the provisioning profile.

7. The method of claim 6, wherein generating the provisioning profile further includes:
    selecting a guest access point name (APN) that corresponds to the guest access service provided by the WLAN, and
    generating the provisioning profile to include the APN.

8. The method of claim 6, further comprising:
    mapping, by the controller, at least one policy of the guest access service provided in the WLAN to the provisioning profile, wherein the at least one policy includes a virtual local access network policy.

9. The method of claim 1, further comprising:
detecting, by the controller, an expiration of an allowed duration of the guest access service;
in response to detecting the expiration of the allowed duration, deleting, by the controller, an entry for the provisioning profile stored in a home subscriber server; and
causing, by the controller, a disconnection of the UE from the guest access service provided by the another access network.

10. The method of claim 9, further comprising:
recycling an International Mobile Subscriber Identity (IMSI) of the provisioning profile by generating a new profile for providing the guest access service to a different UE,
wherein the new profile includes the IMSI combined with a second unique security key different from a first unique security key of the provisioning profile.

11. The method of claim 1, wherein generating the provisioning profile includes:
selecting an identifier from a plurality of identifiers assigned for the guest access service provided by the another access network; and
generating the provisioning profile that includes the identifier, wherein the provisioning profile, when activated, causes the UE to switch to the guest access service provided by the another access network.

12. A method comprising:
obtaining, by a user equipment (UE) from a controller, a provisioning profile, wherein the UE is connected to a guest access service provided by a wireless local access network (WLAN);
activating, by the UE, the provisioning profile to connect to the guest access service provided by an another access network; and
connecting, by the UE, to the guest access service provided by the another access network using the provisioning profile.

13. The method of claim 12, wherein the another access network is a Citizens Broadband Radio Service (CBRS) network and further comprising:
storing, by the UE, the provisioning profile in an embedded subscription identity module (eSIM) or an embedded universal integrated circuit card (eUICC),
wherein the provisioning profile includes a temporary identifier allocated for the guest access service, a public land mobile network (PLMN) network identifier (NID) access point name (APN), which identifies the guest access service in the CBRS network, a unique security key, and an allowed duration of connecting to the guest access service.

14. The method of claim 12, wherein activating the provisioning profile includes:
disabling, by a Local Provisioning Assistant (LPA) of the UE, an active profile of a mobile network operator, wherein the active profile is stored in an embedded subscription identity module (eSIM) or an embedded universal integrated circuit card (eUICC); and
enabling, by the LPA of the UE, the provisioning profile to connect to the guest access service provided by the another access network that is a fifth generation (5G) radio network or a private radio network.

15. The method of claim 12, wherein the another access network is a Citizens Broadband Radio Service (CBRS) network and wherein the provisioning profile includes a shared home network identifier, a network identifier, and an access point name of the CBRS.

16. An apparatus comprising:
a communication interface configured to enable network communications;
a memory configured to store executable instructions; and
a processor coupled to the communication interface and the memory and configured to perform operations including:
detecting a user equipment (UE) that is connected to a guest access service provided by a wireless local access network (WLAN);
generating a provisioning profile for the guest access service; and
providing, to the UE, the provisioning profile to cause the UE to connect to the guest access service provided by another access network.

17. The apparatus of claim 16, wherein the processor performs detecting the UE by:
obtaining, from an enterprise guest portal, information for a secure redirection of the UE to communicate with the communication interface via the WLAN, wherein the enterprise guest portal authenticates the UE for a domain sponsored guest access service provided by the WLAN; and
establishing, with a local profile assistant (LPA) of the UE, a secure connection via the WLAN based on the information, so as to enable access to the guest access service provided by the WLAN and the another access network without any further authentication.

18. The apparatus of claim 17, wherein the processor performs providing the provisioning profile by:
obtaining from the LPA via the secure connection, a request for the provisioning profile, and
providing, to the LPA, the provisioning profile to remotely provision the UE to obtain the guest access service provided by the another access network,
wherein the another access network is a Citizens Broadband Radio Service (CBRS) network, and the provisioning profile further includes at least one of a shared home network identifier (SHNI) or a CBRS network identifier (NID).

19. The apparatus of claim 17, wherein:
the another access network is a private radio network or a fifth generation (5G) network.

20. The apparatus of claim 17, wherein the processor performs providing the provisioning profile by providing a certificate or authentication information for the UE to obtain the guest access service provided by the another access network.

* * * * *